United States Patent [19]

Bezwada

[11] 4,339,359
[45] Jul. 13, 1982

[54] COMPOSITION FOR THE ADHESION OF RUBBER TO REINFORCING MATERIALS

[75] Inventor: Rao S. Bezwada, Somerville, N.J.

[73] Assignee: American Cyanamid Company, Stamford, Conn.

[21] Appl. No.: 235,340

[22] Filed: Feb. 17, 1981

[51] Int. Cl.$^3$ .................. C08L 7/00; C08L 15/02; C08K 3/30; C08K 3/36
[52] U.S. Cl. ................... 524/512; 260/738; 260/746; 260/765; 260/784; 260/788; 525/155; 525/160; 525/161; 525/164
[58] Field of Search ............. 260/3, 3.3, 4 R, 5, 260/3.5, 33.6 AQ, 42.32, 42.33, 738, 765, 788, 746, 784, 42.34, 42.35, 42.36, 42.37, 395 B, 42.14, 42.24; 525/155, 160, 161, 164

[56] References Cited

U.S. PATENT DOCUMENTS

| 3,194,294 | 7/1965 | Van Gils | 525/138 |
| 3,212,955 | 10/1965 | Kaizerman | 260/3 |
| 3,361,617 | 1/1968 | Kaizerman | 260/29.7 D |
| 3,517,722 | 6/1970 | Endter et al. | 260/3 |
| 3,522,127 | 7/1970 | Osborne et al. | 260/3 |
| 3,638,702 | 2/1972 | Endter | 260/3 |
| 3,715,172 | 2/1973 | Dembowski et al. | 260/3 |
| 3,738,948 | 6/1973 | Dunnom | 260/3 |
| 3,951,887 | 4/1976 | Tanimura et al. | 525/164 |
| 3,992,334 | 11/1976 | Harvey | 260/3 |
| 4,038,220 | 7/1977 | Thompson | 260/3 |
| 4,228,045 | 10/1980 | Bezwada | 260/42.37 |

Primary Examiner—John C. Bleutge
Assistant Examiner—Herbert J. Lilling
Attorney, Agent, or Firm—Frank M. Van Riet

[57] ABSTRACT

A method for adhering rubber to reinforcing materials which comprises embedding a textile fiber or metal reinforcing material in a vulcanizable rubber composition comprising rubber, a sulfur vulcanizing agent, high surface area silica and an N-(substituted oxymethyl) melamine compound.

5 Claims, No Drawings

COMPOSITION FOR THE ADHESION OF RUBBER TO REINFORCING MATERIALS

BACKGROUND OF THE INVENTION

It has been conventional practice to prepare various textile reinforcing fibers, to be used in contact with rubber compositions, by pretreating them with a rubber latex and a phenol-formaldehyde resin in which the phenol has almost always been resorcinol. This is the so-called "RFL" (Resorcinol-Formaldehyde-Latex) method. Another method commonly used is to generate a resin in situ in the vulcanized rubber-textile matrix by incorporating therein a formaldehyde (or methylene) donor compound, for example, hexamethylene-tetramine or hexa(methoxymethyl) melamine, and a formaldehyde (or methylene) acceptor compound, for example, a dihydroxy-benzene compound, such as resorcinol. This method has been particularly effective where the reinforcing material is brass-coated steel wire, since pretreatment of the wire with the "RFL" system has proven to be largely ineffective. The methylene donor-acceptor method is described by Endter, U.S. Pat. No. 3,517,722.

SUMMARY OF THE INVENTION

It has now been found, contrary to the above widely-held theory, that excellent adhesion of rubber to reinforcing materials, such as textile fibers or brass-coated steel wires, is achieved by the incorporation into the rubber composition, before vulcanization thereof in the presence of reinforcing materials, of an N-(substituted oxymethyl) melamine compound of Formula I, below.

The N-(substituted oxymethyl) melamine compounds are widely used in tire-cord-adhesion systems and have been widely accepted as methylene donors in the donor-acceptor theory commonly embraced by the industry, in combination with resorcinol. The present invention is surprising since the use of a single component N-(substituted oxymethyl) melamine compound provides adhesion of textile materials or brass-coated steel wire to rubber at least as good as is achieved by the combination with resorcinol. Thus, the discovery is not in accord with accepted practice in the art and provides distinct advantages, the most obvious of which is the elimination of resorcinol or other methyleneacceptor compounds from the tire-cord-adhesion systems.

DESCRIPTION OF THE INVENTION INCLUDING PREFERRED EMBODIMENTS

The novel process of the instant invention comprises embedding a textile fiber or metal reinforcing material in a vulcanizable composition consisting essentially of (A) a natural rubber, synthetic rubber of mixture thereof, (B) a sulfur vulcanizing agent and (C) a compound represented by the formula:

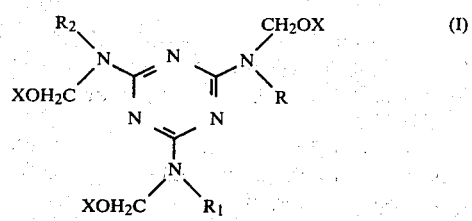

(I)

wherein each X is individually, hydrogen or lower alkyl of 1-8 carbon atoms; R, R$_1$, and R$_2$ are, individually, hydrogen, lower alkyl of 1-8 carbon atoms or the group—CH$_2$OX, wherein X is as defined above.

A particularly useful sub-class of the above compounds are those in which at least one hydroxymethyl or alkoxymethyl group is attached to each nitrogen atom. Hexakis (methoxymethyl) melamine and N,N', N"-tris (methoxymethyl) melamine are particularly preferred species.

The melamine compounds used in the process of the present invention are well-known and are readily prepared by the reaction of melamine or an appropriately substituted melamine compound with formaldehyde. The resulting N-methylolmelamine compounds are then optionally etherified with an appropriate lower alcohol.

The process of the invention may be used to bonding reinforcing fibers or wire to rubber for use in the manufacture of tires, drive belts, conveyor belts, pressure hoses, and the like. The rubber used may be natural rubber; synthetic diene rubbers, such as polybutadiene, polyisoprene; ethylene-propylene terpolymer rubber; butadienestyrene copolymer rubber (SBR); butadiene-acrylonitrile copolymer rubber (NBR); chloroprene; chlorosulfonated polyethylene, and the like, and compatible mixtures thereof.

The reinforcing materials, useful herein, include textile materials, in the form of fibers or fabrics, commonly used to reinforce rubber compositions, such as cotton, rayon, polyamides, polyesters, polyimides, and the like, and metallic materials, such as wires and cords of steel, such as brass-coated steel wire, and the like. The invention is particularly useful with brass-coated steel wire.

The vulcanizable rubber compositions used in the instant process and to which the reinforcing materials are bonded during vulcanization may contain, in addition to the melamine compound described above, other conventional rubber compounding ingredients such as carbon black, antioxidants, accelerators, zinc oxide, processing and softening oils, and the like.

The melamine compounds are incorporated into the vulcanizable rubber composition in an amount of from about 1 to 10 parts by weight per hundred parts by weight of rubber used. Preferably, the compounds are used in an amount of from about 2 to 4 parts by weight, same basis.

Sulfur is the preferred vulcanizing agent. For optimum adhesion of the reinforcing material to rubber, particularly using brass-coated steel wire, a high surface area silica is also incorporated into the vulcanizable rubber composition.

Adhesion is measured using ASTM D-2229-73 with 15 reinforcing members embedded in a 0.5"×0.5"×8" block of rubber. The force needed to pull the metal cord or textile fiber out of the rubber is recorded in pounds per linear inch (pli) or kilo Newtons/meter (kN/m) of embedded length.

The following examples are provided by way of further illustration of the particular features of the invention. All parts are by weight unless otherwise specified.

EXAMPLE A

A polyblend of natural rubber, polybutadiene and butadiene-styrene (75/25) rubber is compounded as follows and used in the evaluation of the adhesion promoters of the invention.

| Polyblend Masterbatch Formulation (A) | |
|---|---|
| | Parts by Weight |
| Natural rubber | 52 |
| Polybutadiene rubber | 18 |
| Butadiene/styrene rubber | 30 |
| Carbon black | 40 |
| Zinc oxide | 5 |
| Stearic acid | 2 |
| Diphenylamine-acetone reaction product antioxidant (50% active) | 2 |
| High Surface area silica | 10 |

EXAMPLE B

A natural rubber masterbatch formulation is prepared as follows:

| Natural Rubber Formulation (B) | |
|---|---|
| | Parts by Weight |
| Natural rubber | 100 |
| Carbon black | 40 |
| Zinc oxide | 5 |
| Stearic acid | 2 |
| Antioxidant (same as Example A) | 2 |
| High Surface area silica | 10 |

In the examples which follow, one or the other of the polyblend or natural rubber formulations is used, in each case in an amount containing 100 parts of rubber.

EXAMPLE 1

Hexakis(methoxymethyl) melamine is evaluated in Natural Rubber Formulation, (B) as a promoter for the adhesion of brass-coated steel wire to rubber, and compared with a similar composition containing resorcinol. The compositions are vulcanized at 153° C. Data are given below.

| | Composition, Parts | |
|---|---|---|
| | A | B |
| Variable | | |
| Hexakis(methoxymethyl)melamine | 3 | 3 |
| Resorcinol | — | 2 |
| Adhesion data are given below. | | |
| Adhesion, kN/m* | | |
| Unaged | 40.9 | 37.7 |
| Aged 4 days/85° C./100% RH | 35.1 | 32.1 |
| Aged 24 hours/90° C./5% NaCl Soln. | 7.5 | 3.5 |

*1 kN/m = 5.71 pli

EXAMPLE 2

The procedure of Example 1 was followed except that Polyblend Masterbatch Formulation (A) is used instead of natural rubber.

| | Composition, Parts | |
|---|---|---|
| | | |
| Variable | | |
| Hexakis(methoxymethyl)melamine | 3 | 3 |
| Resorcinol | — | 2 |
| Adhesion data are given below. | | |
| Adhesion, kN/m | | |
| Unaged | 40.5 | 42.5 |
| Aged 4 days 85° C./100% RH | 30.0 | 24.8 |
| Aged 24 hours/90° C./5% NaCl Soln. | 10.0 | 8.5 |

The adhesion data in Examples 1 and 2 illustrate that hexakis(methoxymethyl) melamine provides equal or better adhesion of brass-coated steel wire to both natural rubber and synthetic rubber compared with the combination of hexakis(methoxymethyl) melamine plus resorcinol. Adhesion in aged rubber stock is significantly better when hexakis(methoxymethyl) melamine is used alone.

EXAMPLE 3-10

Several N-(substituted oxymethyl)melamine compounds are evaluated for their ability to promote adhesion between brass-coated steel cord and synthetic rubber using Polyblend Masterbatch Formulation (A). The compositions are vulcanized at 153° C. Data are given below. All compositions contain 10 parts of high surface area silica.

| Ex. No. | N-(Subst. oxymethyl)melamine | Adhesion, kN/m |
|---|---|---|
| — | None (Control) | 24.5 |
| 3 | $MF_{5.5}Me_{5.2}$* | 36.8 |
| 4 | $MF_{5.6}Me_{4.5}$ | 32.4 |
| 5 | $MF_3$ | 36.1, 36.8 |
| 6 C | $MF_2$ | 24.3 |
| 7 | $MF_2Me_{2.4}$ | 42.3 |
| 8 | $MF_{5.8}Me_{5.5}$ | 37.7 |
| 9 | $MF_{5.8}Me_{1.9}Et_{3.6}$ | 37.1 |
| 10 | $MF_5Bu_4$ | 36.8 |

C = Comparative
*1 Mole of melamine condensed with 5.5 moles of formaldehyde and etherified with 5.2 moles of methanol; average analysis of reaction products. Et represents ethanol; Bu represents n-butanol.

The data illustrate that good adhesion of brass-coated steel cord to synthetic rubber is achieved in the presence of the N-(substituted oxymethyl) melamine compounds using the process of the present invention and in the absence of a methylene acceptor compound such as resorcinol.

We claim:

1. A composition for the adhesion of a textile fiber or a steel cord to rubber in the absence of a methylene acceptor which consists essentially of (1) a vulcanizable natural or synthetic rubber, (2) a sulfur vulcanizing agent, (3) from about 2 to 14 parts, by weight, per 100 parts, by weight, of rubber, of a high surface area silica and (4) from about 1 to 10 parts, by weight, per 100 parts, by weight, of rubber, of an N-(substituted oxymethyl)-melamine compound represented by the formula:

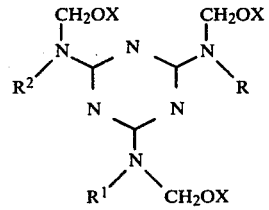

wherein each X represents, individually, hydrogen or a lower ($C_1$–$C_8$) alkyl radical; R, $R_1$, $R_2$ are, individually, hydrogen, a lower ($C_1$–$C_8$) alkyl radical, or the group —$CH_2OX$.

2. A composition according to claim 1 wherein said rubber is natural, polybutadiene, polyisoprene, ethylene-propylene terpolymer rubber, butadiene-styrene copolymer rubber, butadiene-acrylonitrile copolymer rubber, chloroprene rubber, chlorosulfonated polyethylene or mixtures thereof.

3. A composition according to claim 1 wherein said melamine compound is hexakis (methoxymethyl) melamine.

4. A composition according to claim 1 wherein R, $R_1$, and $R_2$ are all —$CH_2$—OX groups.

5. A composition according to claim 1 which contains, in addition to the components thereof, carbon black, an antioxidant, zinc oxide and a processing oil.

* * * * *